US010364851B2

(12) United States Patent
Showalter

(10) Patent No.: US 10,364,851 B2
(45) Date of Patent: Jul. 30, 2019

(54) LATCHING CLUTCH HAVING A BALL DETENT LATCHING DEVICE REQUIRING A REDUCED AMOUNT OF HYDRAULIC PRESSURE

(71) Applicant: BorgWarner Inc., Auburn Hills, MI (US)

(72) Inventor: Dan Joseph Showalter, Suttons Bay, MI (US)

(73) Assignee: BorgWarner Inc., Auburn Hills, MI (US)

( * ) Notice: Subject to any disclaimer, the term of this patent is extended or adjusted under 35 U.S.C. 154(b) by 87 days.

(21) Appl. No.: 15/505,323

(22) PCT Filed: Aug. 12, 2015

(86) PCT No.: PCT/US2015/044756
§ 371 (c)(1),
(2) Date: Feb. 21, 2017

(87) PCT Pub. No.: WO2016/032748
PCT Pub. Date: Mar. 3, 2016

(65) Prior Publication Data
US 2017/0268581 A1    Sep. 21, 2017

Related U.S. Application Data

(60) Provisional application No. 62/041,200, filed on Aug. 25, 2014.

(51) Int. Cl.
*F16D 25/02* (2006.01)
*F16D 13/54* (2006.01)
(Continued)

(52) U.S. Cl.
CPC ............ *F16D 25/02* (2013.01); *F16D 13/54* (2013.01); *F16D 21/06* (2013.01);
(Continued)

(58) Field of Classification Search
USPC ...................................................... 192/70.22
See application file for complete search history.

(56) References Cited

U.S. PATENT DOCUMENTS 2,639,013 A * 5/1953 Meschia ................. F16D 13/54
                                                                192/109 B
4,550,817 A    11/1985 Euler
(Continued)

FOREIGN PATENT DOCUMENTS

DE        2540191 A1     3/1977
JP        S62034226 U1   2/1987
JP        2014-141998 A  8/2014

OTHER PUBLICATIONS

International Search Report for Application No. PCT/US2015/044756 dated Oct. 27, 2015, 4 pages.
(Continued)

*Primary Examiner* — Mark A Manley
(74) *Attorney, Agent, or Firm* — Howard & Howard Attorneys PLLC

(57) ABSTRACT

A power-transmitting device (10) and a method of assembling a power-transmitting device (10) secures and releases driving continuity between driving and driven parts (22, 62) through at least one clutch assembly (26, 66). The power-transmitting device (10) includes an apply plate (36) axially moveable with respect to the clutch assembly (26, 66) for engaging and disengaging the clutch assembly (26, 66). A return spring (34) acting on the apply plate (36) and an apply spring (32) having a higher compression force than the return spring (34) can be located between the apply plate (36) and the clutch assembly (26, 66). A ball (38) can be engageable with a portion of the apply plate (36) for locking the apply plate (36) in engagement with the clutch assembly (26, 66) during a steady state condition and a piston (40) can (Continued)

drive the ball (38) into engagement with the apply plate (36) in response to application of fluid under pressure.

16 Claims, 4 Drawing Sheets

(51) Int. Cl.
  *F16D 25/12* (2006.01)
  *F16D 21/06* (2006.01)
  *F16D 25/0638* (2006.01)
(52) U.S. Cl.
  CPC ......... *F16D 25/0638* (2013.01); *F16D 25/12* (2013.01); *F16D 2021/0661* (2013.01)

(56) References Cited

U.S. PATENT DOCUMENTS

| | | |
|---|---|---|
| 2008/0314711 A1 | 12/2008 | Jayaram et al. |
| 2011/0290610 A1 | 12/2011 | Arnold et al. |
| 2014/0151181 A1 | 6/2014 | Reimnitz |

OTHER PUBLICATIONS

English language abstract and machine-assisted English translation for JP 2014-141998 extracted from espacenet.com database on Feb. 27, 2017, 15 pages.

English language abstract and machine-assisted English translation for DE 25 40 191 extracted from espacenet.com database on Mar. 29, 2018, 6 pages.

Machine-assisted English translation for JPS 62-04226 extracted from PAJ database on Mar. 29, 2018, 6 pages.

\* cited by examiner ural pressure. The maintenance of this high pressure of hydraulic pressure. The maintenance of this high pressure of hydraulic.

LATCHING CLUTCH HAVING A BALL DETENT LATCHING DEVICE REQUIRING A REDUCED AMOUNT OF HYDRAULIC PRESSURE

CROSS-REFERENCE TO RELATED APPLICATIONS

This application is the National Stage of International Patent Application No. PCT/US2015/044756, filed on Aug. 12, 2015, which claims priority to and all the advantages of U.S. Provisional Patent Application No. 62/041,200, filed on Aug. 25, 2014, the content of which is incorporated herein by reference.

FIELD OF THE INVENTION

The invention relates to a power-transmitting device using friction for securing and releasing driving continuity as between driving and driven parts, and more particularly to an actuating device that causes the power-transmitting device to transition into or out of a state for providing driving continuity between the driving and driven parts, where the actuating device is powered by the action of a fluid under pressure including an enclosure having a partition is slidably received in sealing engagement with the enclosure, fluid being admitted into the enclosure to apply a force to the enclosure and the partition, the enclosure or the partition being connected to and rotating integrally with the driving or driven part, relative displacement of the enclosure and partition due to the force applied by the fluid contributing to the transition of the power-transmitting device into or out of the state for providing the driving continuity between the driving and driven parts, where the power-transmitting device includes power-transmitting elements having mutually engageable surfaces for transmitting power from one to another substantially solely by friction forces when pressed together, such that the power-transmitting elements are engageable and disengageable by relative movement along a path parallel to an axis of rotation of at least one of the power-transmitting elements, where the mutually engageable surfaces of the power-transmitting elements are substantially planar, and the power-transmitting device has at least three of the power-transmitting elements.

BACKGROUND

Dual clutch transmissions (DCT) require the maintenance of a force on the clutch to maintain the driving torque. These clutches are typically designed so that the clutches are failsafe open to disconnect from the driving wheels in the event of a hydraulic or electrical failure of the transmission. Therefore a relatively high pressure is required to hold the clutch in an engaged state. When the DCT equipped vehicle is driven in a near steady state condition, such as when cruising on the highway, the pump is required to maintain a relatively high pressure. The maintenance of this high pressure has a detrimental effect on fuel economy.

SUMMARY

The clutch arrangement includes a pre-compressed "lost motion" spring to allow the clutch to function in the non locking load range normally. When a lock is requested, the pressure is increased above normal range to compress this spring and allow the mechanical lock or latch to engage and hold the clutch at or above the maximum load. This allows the main pressure to be reduced as a low pilot pressure holds a piston in a position which keeps the balls engaged with the groove in the apply plate which in turn holds the apply plate engaged without the need for high pressure to retain the apply plate. In other words, a ball detent latching device is provided, where a small amount of hydraulic pressure is required to hold the clutch in engagement which reduces the energy losses of maintaining the clutch at a high pressure during steady state operation.

In the clutch arrangement, there is at least one disk stack including plural driving and driven disks. The disk stack can compress an apply spring having a higher compression force than a return spring, which is employed between an enclosure and a partition. The disk stack is coupled to a lost motion retainer enclosing the apply spring and the return spring. An apply plate, which is movable along an axis for compressing the apply spring within the lost motion retainer, is also included. The apply plate, having a groove formed therein, can engage with a ball when the apply spring is compressed. A piston can be actuated in response to application of fluid under pressure for driving the ball into engagement with the groove of the apply plate.

A power-transmitting device is disclosed for securing and releasing driving continuity between driving and driven parts through a clutch assembly having at least one disk stack. The power-transmitting device can have an apply plate axially moveable with respect to the at least one disk stack for engaging and disengaging the clutch assembly. A return spring can act on the apply plate and an apply spring can be provided having a higher compression force than the return spring. The apply spring and the return spring can be located between the apply plate and at least one disk stack. At least one ball can be engageable with a portion of the apply plate for locking the apply plate in engagement with the at least one disk stack during a steady state condition. A piston can be provided for driving the at least one ball into engagement with the apply plate in response to application of fluid under pressure.

A method is disclosed of assembling a power-transmitting device for securing and releasing driving continuity between driving and driven parts through a clutch assembly having at least one disk stack. The power-transmitting device can have an apply plate axially moveable with respect to the at least one disk stack for engaging and disengaging the clutch assembly. The method can include connecting a return spring to act on the apply plate, and assembling an apply spring having a higher compression force than the return spring. The apply spring and the return spring can be located between the apply plate and at least one disk stack. The method can include engaging at least one ball with a portion of the apply plate for locking the apply plate in engagement with the at least one disk stack during a steady state condition, and positioning a piston for driving the at least one ball into engagement with the apply plate in response to application of fluid under pressure.

A power-transmitting device is disclosed using friction for securing and releasing driving continuity as between driving and driven parts, and including an actuating device for transitioning the power-transmitting device into or out of a state providing driving continuity between the driving and driven parts. The actuating device can be powered by action of a fluid under pressure. The actuating device can include an enclosure and an apply plate slidably received in sealing engagement with the enclosure. Fluid can be admitted into the enclosure to apply a force to the enclosure and the apply plate. The enclosure or the apply plate can be connected to and rotated integrally with the driving or driven part. Relative displacement of the enclosure and apply plate can be provided due to the force applied by the fluid contributing to transition of the power-transmitting device into or out of the state providing driving continuity between the driving and driven parts. A return spring can act on the apply plate. An apply spring can have a higher compression force than the return spring and can be located between the enclosure and the apply plate. A lost motion retainer can enclose the apply spring and the return spring. The apply plate can be movable along an axis for compressing the apply spring within the lost motion retainer. The apply plate can have at least one groove formed therein. At least one ball can be engageable within the at least one groove of the apply plate when the apply spring is compressed. A piston can be provided for driving the at least one ball into engagement with the at least one groove of the apply plate in response to application of fluid under pressure. During a normal mode of operation, the apply plate compresses the return spring in response to application of fluid under pressure to transition into a state providing driving continuity between the driving and driven parts. During a locked mode of operation, the apply plate compresses the return spring and the apply spring allowing the ball to engage within the groove of the apply plate in response to application of fluid pressure to the apply plate and to the piston, such that the apply plate is locked in a state providing driving continuity between the driving and driven parts, while allowing discontinuation of application of fluid pressure to the apply plate, and wherein application of fluid under a decreased pilot pressure to the piston maintains the at least one ball within the at least one groove of the apply plate, and further wherein interruption of the decreased pilot pressure to the piston disengages the ball from within the groove of the apply plate allowing a transition into a state out of driving continuity between the driving and driven parts.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
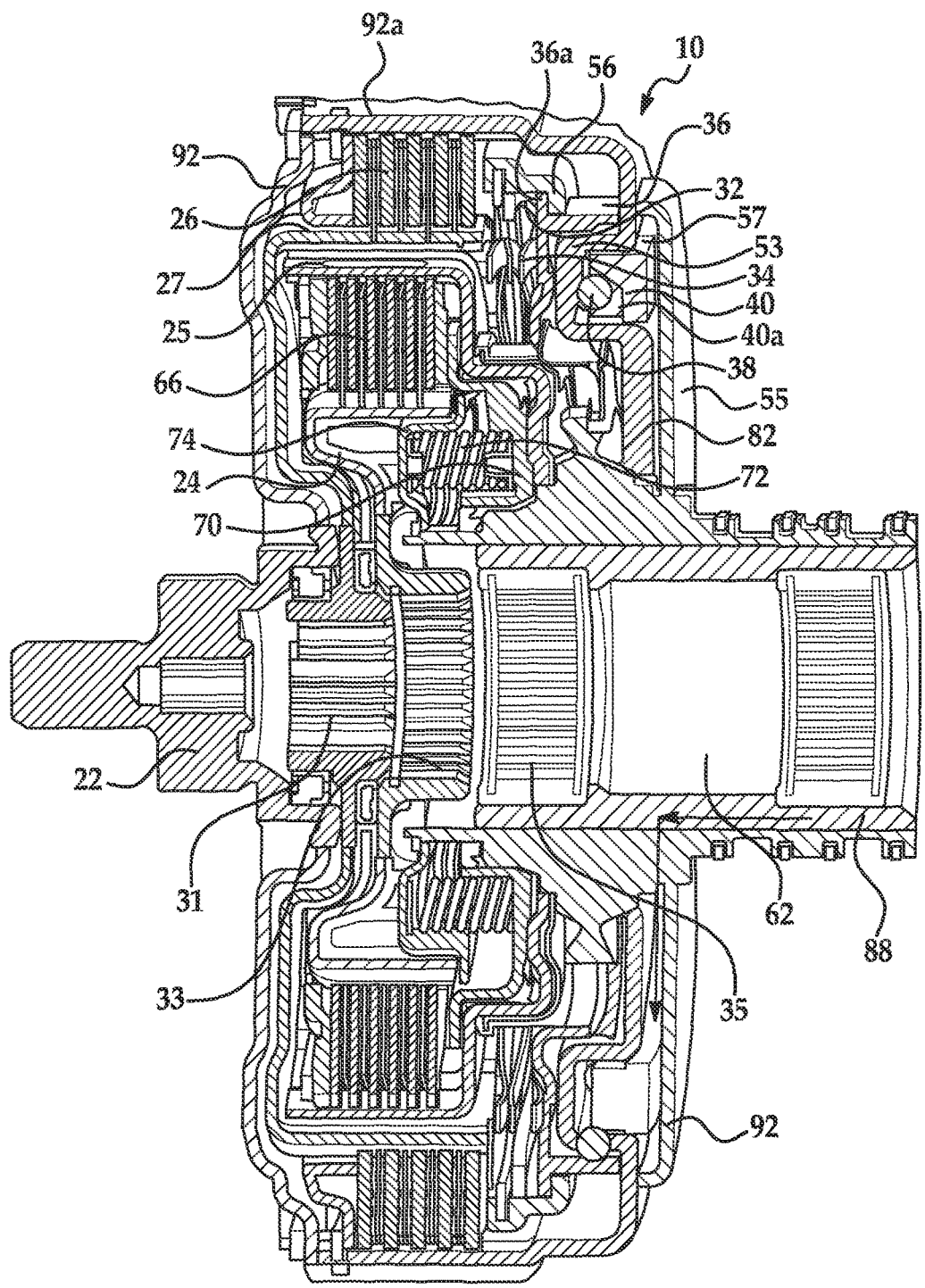
FIG. 1 is a cross sectional view of a dual clutch transmission showing a clutch assembly in an unlocked position.

Referring now to FIGS. 1-4, a power-transmitting device 10 can be operable for securing and releasing driving continuity between driving parts 22 and driven parts 62 through a clutch assembly having at least one disk stack 26, 66. As illustrated in FIGS. 1-4, the power-transmitting device 10 can be used in a dual clutch transmission having a first and second transmission shaft 22, 62. Each of the first and second transmission shaft 22, 62 can include at least one gear 31, 33, 35 rotatable about a first longitudinal axis and connected to the corresponding one of the first and second transmission shaft 22, 62. The at least one gear 31, 33, 35 can engage with ratio defining gears rotatable about a second longitudinal axis on an output shaft (not shown). It should be recognized by those skilled in the art that the dual clutch transmission can be configured to have a varying number of gears for selective torsional connection between at least one transmission shaft and an output shaft. As illustrated in FIGS. 1-4, the dual clutch transmission 10 can include two clutch assemblies located in a transmission housing 92. Each clutch assembly can have a disk stack 26, 66 having an inner and outer set of interleaved clutch plates. By way of example and not limitation, the transmission housing 92 can include a first hub portion 27 for supporting an inner set of clutch plates of a first disk stack 26. An exterior portion 92a of the housing 92 can support an outer set of clutch plates of the first disk stack 26. The first hub portion 27 can be connected for rotation with a first gear 31 connected to a first transmission shaft 22. A second hub portion 24 can be connected for rotation with a second gear 33 and can support an inner set of clutch plates of a second disk stack 66. A third hub portion 25 can support an outer set of clutch plates of the second disk stack 66 and can be connected for rotation with a third gear 35 connected to a second transmission shaft 62. The second gear 33 can be interposed between the first gear 31 and the third gear 35. The first disk stack 26 can be selectively compressed by a clutch input force in response to actuation from an operator or an operating system.

Figure 2:
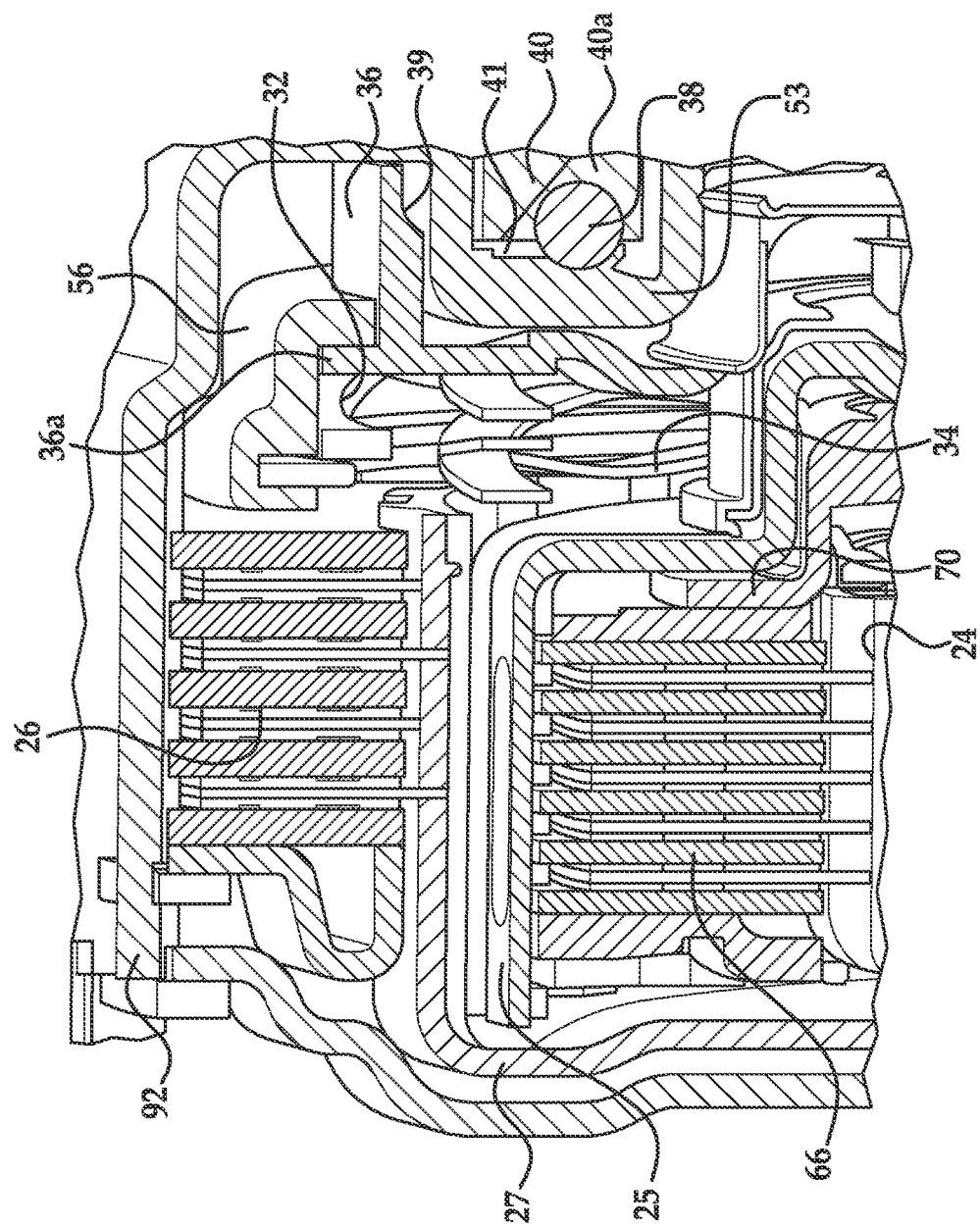
FIG. 2 is a detailed cross sectional view of the dual clutch transmission shown in FIG. 1 illustrating the ball detent latching device disengaged with respect to the clutch apply plate.

At least one of the disk stacks 26, 66 can be engageable by a lost motion retainer 56 located within the housing 92. The lost motion retainer 56 can have a curved or bent peripheral surface for sealingly engaging a flange 36a of the apply plate 36, coupling the lost motion retainer 56 and the apply plate 36 for axial movement. The lost motion retainer 56 can enclose the apply spring 32 and the return spring 34. The apply plate 36 can move axially with respect to an inner chamber wall 53 defined by the housing 92. As illustrated in FIGS. 1-2, the return spring 34 can normally bias the apply plate 36 toward the inner chamber wall 53 until the corresponding clutch assembly or first disk stack 26 is loaded at a predetermined maximum input force. When the clutch is assembly is loaded at the maximum clutch load, the return spring 34 can be compressed so as to control the apply plate 36 in a normal mode. The apply plate 36 and the lost motion retainer 56 can be axially movable for compressing an apply spring 32. The apply spring 32 can be arranged in the lost motion retainer 56. In a normal mode of operation, the apply plate 36 can compress the return spring 34 in response to application of fluid under pressure to transition into a state providing driving continuity between driving and driven parts or first and second transmission shafts 22, 62. The apply plate 36 can be driven to further compress the apply spring 32 and the return spring 34 to transition into a locked mode of operation. In the locked mode of operation, the apply plate 36 can maintain the compressed state of the return spring 34 and the apply spring 32. The apply spring 32 can have a higher compression force than the return spring 34.

Figure 4:
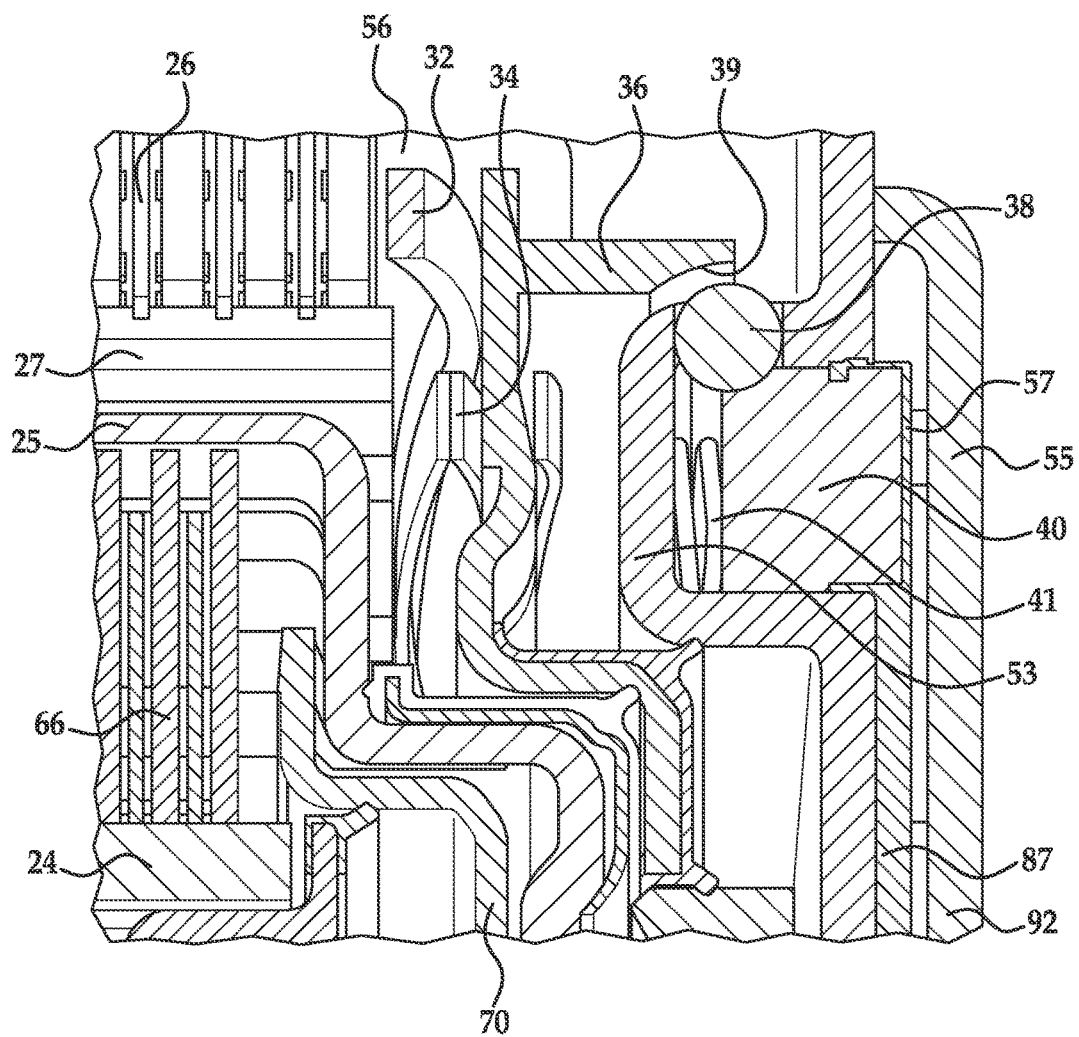
FIG. 4 is a detailed cross sectional view of the dual clutch transmission shown in FIG. 3 illustrating the ball detent latching device driven by the piston for engagement with a groove defined by the clutch apply plate.

The apply plate 36 can have a groove 39 formed therein to be operably engageable with at least one ball 38. By way of example and not limitation, the power-transmitting device 10 can include six balls 38 angularly spaced about a periphery of the apply plate 36. Each ball 38 can be supported within an inner chamber defined by the inner chamber wall 53 of the housing 92. The housing 92 can define an outer chamber wall 55 and a piston 40 can be received in the chamber defined by the inner and outer chamber wall 53, 55. As best illustrated in FIG. 2, the piston 40 can define at least one inclined planar wedge, groove or surface 40a. One of the balls 38 can move along the corresponding inclined wedge, groove or surface 40a for switching the power-transmitting device 10 between a normal mode of operation and a locked mode of operation. The piston 40 can be held within the chamber of the housing 92 and biased toward the normal mode of operation, i.e. away from the inner chamber wall 53 by spring 41 best seen in FIGS. 2 and 4. An opposite end of the piston 40 is in fluid communication with pressurized fluid through fluid passages 57, 82. By way of example and not limitation, the fluid passages 57, 82 can be in fluid communication with the piston 40 to move the piston between the normal mode of operation position (as best seen in FIG. 2) and the locked mode of operation position (as best seen in FIG. 4). It should be recognized by those skilled in the art that the piston 40 can be shaped as a ring piston moveable axially with an annular chamber formed between the inner and outer chamber walls 53, 55 of the housing 92. When pressurized fluid, such as oil is fed through the fluid supply channel 82 of the chamber for actuating the piston 40, the fluid pressure and centrifugal forces acting on the ball 38 in cooperation with the inclined planar wedge, groove, or surface 40a of the piston 40 forces the corresponding ball 38 toward the groove 39 formed in the apply plate 36 to counteract the centrifugal pressure of the oil. After engagement in the locked position, continued application of fluid under an initial pilot fluid pressure to the piston 40 maintains the ball 38 within the groove of the apply plate 36 until the reduced pilot fluid pressure is released. By way of example and not limitation, the reduced pilot fluid pressure can be less than one (1) bar. In the normal mode of operation, the apply plate 36 compresses the return spring 34 in response to application of fluid under pressure to transition into a state providing driving continuity. In the locked mode of operation, the apply plate 36 compresses the return spring 34 and the apply spring 32 allowing the ball 38 to engage within the groove 39 in response to the application of a higher actuation fluid pressure to the apply plate 36 and to the piston 40. When in the locked mode of operation, the apply plate 36 can be locked in a state providing driving continuity between driving and driven parts 22, 62 while allowing discontinuation of the application of higher actuation fluid pressure to the apply plate 36, while requiring only the maintenance of only the reduced pilot fluid pressure to hold the locked mode of operation.

The piston 40 can axially move in response to pressure of fluid, i.e. both centrifugal force and pressurized fluid forces. Application of fluid under a decreased pilot pressure to the piston 40 can maintain the ball 38 within the groove of the apply plate 36. Interruption of the decreased pilot pressure to the piston 40 can allow the return spring 34 to disengage the ball 38 from within the groove of the apply plate 36 allowing the transition into a state out of driving continuity between the driving and driven parts 22, 62. For application of fluid, a fluid supply channel 82 can be in fluid communication with an oil pump or a valve and controlled by a controller or an operating system. The fluid can flow through a distribution sleeve 88 and be supplied to the chamber defined between the inner and outer chamber wall 53, 55 through the fluid supply channel 82.

In a normal mode of operation, the apply plate 36 can compress the return spring 34 in response to application of fluid under pressure to transition into a state providing driving continuity between the driving and driven parts, or first and second transmission shafts 22, 62. In a locked mode of operation, the apply plate 36 can compress the return spring 34 and the apply spring 32 allowing the ball 38 to engage within the groove of the apply plate 36 in response to application of fluid pressure to the apply plate 36 and to the piston 40, such that the apply plate 36 is locked in a state providing driving continuity between the driving and driven parts, while allowing discontinuation of application of fluid pressure to the apply plate 36. By way of example and not limitation, the axial movement of the apply plate 36 can engage and disengage the first disk set 26 corresponding to a first transmission shaft 22 as part of a first clutch assembly in a dual clutch transmission.

The dual clutch transmission can further include a second clutch assembly coupled to a second transmission shaft 62. The second transmission shaft 62 is connected to a second disk stack 66. The second disk stack 66 does not link or engage with any corresponding elements of the lost motion retainer 56. The second disk stack 66 is engageable and disengageable by a second apply plate 70 normally biased away from the second disk stack 66 by a coil spring 72 interposed between the second apply plate 70 and an inner hub 74. The inner hub 74 can be connected to a portion of the housing 92. Based on application of fluid, the dual clutch transmission 10 can phase out the first gear 31 between the first hub portion 27 and the first transmission shaft 22 and phase in a third gear 35 connected to a second transmission shaft 62 through a second gear 33 connected to the hub portion supporting the second disk stack 66. The plurality of intermeshing clutch disks and the driving and driven disks of the first and second disk stacks 26, 66 can be moved between a disengaged position and a engaged position of the clutch in response to application of fluid pressure.

Figure 3:
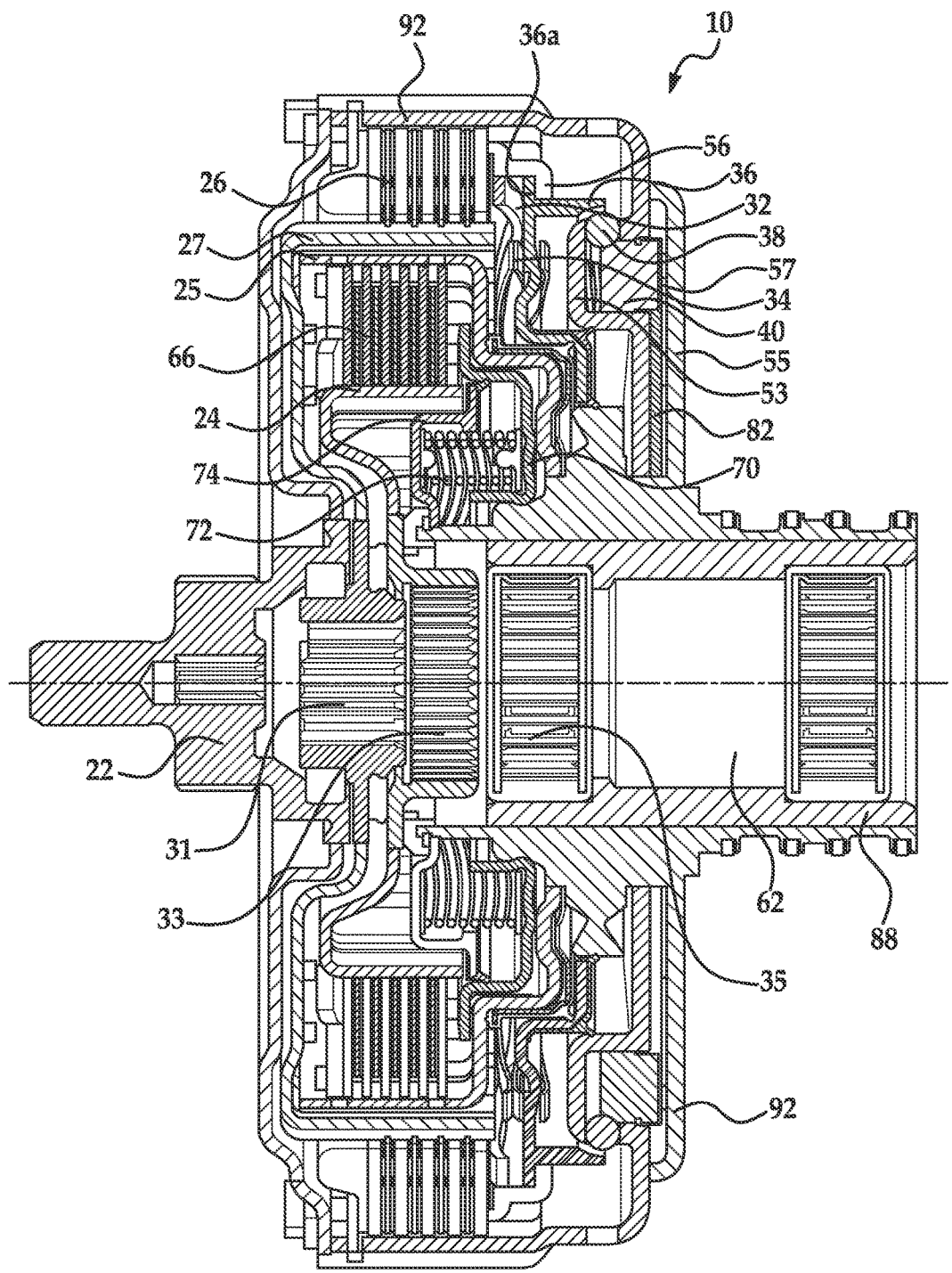
FIG. 3 is a cross sectional view of the dual clutch transmission of FIG. 1 showing the clutch assembly held in a locked position when the clutch assembly is engaged by a clutch apply plate driven by the piston through the ball engaged between the piston and the clutch apply plate.

In response to the movement of the first disk stack 26, the apply spring 32, the return spring 34, or the both the apply spring 32 and the return spring 34 can be compressed. The dual clutch transmission can perform a power transmission in different modes, i.e., the locked mode and the normal mode, based on compressed states of the apply spring 32. The apply spring 32 and the return spring 34 control the movement of the apply plate 36, but the movement thereof is limited between the first disk stack 26 and the lost motion retainer 56. As illustrated in FIGS. 1-2, in the normal mode, fluid pressure in the chamber defined between the inner and outer chamber wall 53, 55 is in a predetermined normal range. Accordingly, the ball 38 remains stationary within the inclined planar wedge, groove or surface 40a of the piston 40 for locking the apply plate 36. As illustrated in FIGS. 3-4, in the locked mode of operation, increased fluid pressure in the chamber defined between the inner and outer chamber wall 53, 55 forces the ball 38 to move radially outwardly along the inclined planar wedge, groove or surface 40a of the piston 40 to engage within the groove 38 defined by the apply plate 36. The increased fluid pressure allows the mechanical lock or latch to engage and hold the clutch at or above the maximum load. The ball 38 can be driven by a centrifugal pressure of fluid in combination with the fluid pressure. The additional centrifugal pressure of fluid drives the ball 38 radially outwardly and axially drives the piston 40. The combined movement allows the main pressure supplied to the apply plate 36 to be reduced to a low pilot pressure in order to hold the piston 40 in a position, which keeps the ball 38 engaged with the groove 38 defined by the apply plate 36, which in turn holds the apply plate 36 engaged without the need for high pressure to retain the components in the engaged position.

The power-transmitting device 10 can use friction for securing and releasing driving continuity as between driving and driven parts 22, 62 and can include an actuating device for transitioning the power-transmitting device 10 into or out of a state providing driving continuity between the driving and driven parts. The actuating device can be powered by action of a fluid under pressure and can include an enclosure and an apply plate 36 slidably received in sealing engagement with the enclosure. Fluid can be admitted into the enclosure to apply a force to the enclosure and the apply plate 36. One of the enclosure and the apply plate 36 can be connected to and rotating integrally with the driving or driven part 22, 62 such that relative displacement of the enclosure and the apply plate 36 due to the force applied by the fluid can contribute to transition of the power-transmitting device 10 into or out of the state providing driving continuity between the driving and driven parts 22, 62. The power-transmitting device 10 can include a return spring 34 acting on the apply plate 36, an apply spring 32 having a higher compression force than the return spring 34 located between the enclosure and the apply plate 36, and a lost motion retainer 56 enclosing the apply spring 32 and the return spring 34. The apply plate 36 can have a groove 39 formed therein and can be axially movable for compressing the apply spring 32 within the lost motion retainer 56. The power-transmitting device 10 can include a ball 38 engageable within the groove 39 of the apply plate 36 when the apply spring 32 is compressed, and a piston 40 for driving the ball 38 into engagement with the groove 39 of the apply plate 36 in response to application of fluid under pressure.

The power-transmitting device 10 can be operable in a normal mode of operation, wherein the apply plate 36 can compress the return spring 34 in response to application of fluid under pressure to transition into a state providing driving continuity between the driving and driven parts 22, 62 and a locked mode of operation, wherein the apply plate 36 compresses the return spring 34 and the apply spring 32 allowing the ball 38 to engage within the groove 39 of the apply plate 36 in response to application of fluid pressure to the apply plate 36 and to the piston 40, such that the apply plate 36 is locked in a state providing driving continuity between the driving and driven parts 22, 62, while allowing discontinuation of application of a higher actuation fluid pressure to the apply plate 36, wherein application of fluid under a decreased pilot pressure to the piston 40 maintains the ball 38 within the groove 39 of the apply plate 36, and wherein interruption of the decreased pilot pressure to the piston 40 disengages the ball 38 from within the groove 39 of the apply plate 36 allowing a transition into a state out of driving continuity between the driving and driven parts 22, 62.

A method of assembling a power-transmitting device 10 for securing and releasing driving continuity between driving and driven parts 22, 62 through a clutch assembly having at least one disk stack 26, 66 can be used for a power-transmitting device 10 having an apply plate 36 axially moveable with respect to the at least one disk stack 26, 66 for engaging and disengaging the clutch assembly. The method can include connecting a return spring 34 to act on the apply plate 36 and assembling an apply spring 32 having a higher compression force than the return spring 34. The apply spring 32 and the return spring 34 can be located between the apply plate 36 and at least one disk stack 26, 66. The method can further include engaging at least one ball 38 with a portion of the apply plate 36 for locking the apply plate 36 in engagement with the at least one disk stack 26, 66 during a steady state condition. The method can further include positioning a piston 40 for driving the at least one ball 38 into engagement with the apply plate 36 in response to a combination of the application of fluid under pressure and centrifugal force of the fluid. The method can further include operating in a normal mode of operation and in a locked mode of operation. In the normal mode of operation, the apply plate 36 can compress the return spring 34 in response to application of an intermediate compression force by fluid under pressure to transition into a state providing driving continuity between the driving and driven parts 22, 62. In the locked mode of operation, the apply plate 36 can compress the return spring 34 and the apply spring 32 allowing the ball 38 to engage within a groove 39 of the apply plate 36 in response to application of a higher actuating compressive force by fluid under pressure to the apply plate 36 and to the piston 40, such that the apply plate 36 is locked in a state providing driving continuity between the driving and driven parts 22, 62, while allowing discontinuation of application of higher actuating compressive forced of fluid under pressure to the apply plate 36 and requiring a minimal lower pilot compressive force by fluid under pressure to maintain the locked mode of operation.

The method can further include maintaining the ball 38 within a groove 39 of the apply plate 36 by applying fluid under a decreased pilot pressure to the piston 40. The method can further include disengaging the ball 38 from within the groove 39 of the apply plate 36 by interrupting the decreased pilot pressure to the piston 40 allowing a transition into a state out of driving continuity between the driving and driven parts 22, 62.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a power-transmitting device (10) for securing and releasing driving continuity between driving and driven parts (22, 62) through a clutch assembly having at least one disk stack (26, 66), the power-transmitting device (10) having an apply plate (36) axially moveable with respect to the at least one disk stack (26, 66) for engaging and disengaging the clutch assembly, the improvement comprising:
   a return spring (34) acting on the apply plate (36), wherein the apply plate (36) directly contacts the return spring (34);
   an apply spring (32) having a higher compression force than the return spring (34), the apply spring (32) and the return spring (34) located between the apply plate (36) and at least one disk stack (26, 66);
   at least one ball (38) engageable with a portion of the apply plate (36) for locking the apply plate (36) in engagement with the at least one disk stack (26, 66) during a steady state condition; and a piston (40) for driving the at least one ball (38) into engagement with the apply plate (36) in response to application of fluid under pressure.

2. The improvement of claim 1 further comprising:
a normal mode of operation, wherein the apply plate (36) compresses the return spring (34) in response to application of an intermediate compressive force applied by a fluid under pressure to transition into a state providing driving continuity between the driving and driven parts (22, 62).

3. The improvement of claim 1, wherein the apply plate (36) includes at least one groove (39) formed therein for receiving the at least one ball (38).

4. The improvement of claim 3 further comprising:
a locked mode of operation, wherein the apply plate (36) compresses the return spring (34) and the apply spring (32) allowing the ball (38) to engage within the groove (39) of the apply plate (36) in response to application of a higher compressive force applied by fluid under pressure to the apply plate (36) and to the piston (40), such that the apply plate (36) is locked in a state providing driving continuity between the driving and driven parts (22, 62), while allowing discontinuation of application of the higher compressive force applied by the fluid under pressure to the apply plate (36).

5. The improvement of claim 4, wherein application of a minimal compressive force applied by fluid under a decreased pilot pressure to the piston (40) maintains the ball (38) within the groove (39) of the apply plate (36).

6. The improvement of claim 5, wherein interruption of the decreased pilot pressure to the piston (40) allows the return spring (34) to disengage the ball (38) from within the groove (39) of the apply plate (36) allowing a transition into a state out of driving continuity between the driving and driven parts (22, 62).

7. The improvement of claim 1 further comprising:
a lost motion retainer (56) enclosing the apply spring (32) and the return spring (34).

8. The improvement of claim 7, wherein the power-transmitting device (10) includes a pair of transmission shafts (22, 62) and a first disk stack (26) and a second disk stack (66), each of the first and second disk stack (26, 66) associated with one of the pair of transmission shafts (22, 62), the first disk stack (26) associated with the lost motion retainer (56).

9. The improvement of claim 7 further comprising:
the at least one disk stack (26) engaging with the lost motion retainer (56) and the apply plate (36); and
an actuating device moveable between a normal mode of operation wherein the at least one disk stack (26) moves to compress the return spring (34), and a locked mode of operation wherein the at least one disk stack (26) allows movement that compresses both the apply spring (32) and the return spring (34).

10. A method of assembling a power-transmitting device (10) for securing and releasing driving continuity between driving and driven parts (22, 62) through a clutch assembly having at least one disk stack (26, 66), the power-transmitting device (10) having an apply plate (36) axially moveable with respect to the at least one disk stack (26, 66) for engaging and disengaging the clutch assembly, the method comprising:
positioning a return spring (34) to act on the apply plate (36), wherein the apply plate (36) directly contacts the return spring (34);
assembling an apply spring (32) having a higher compression force than the return spring (34), the apply spring (32) and the return spring (34) located between the apply plate (36) and at least one disk stack (26, 66);
engaging at least one ball (38) with a portion of the apply plate (36) for locking the apply plate (36) in engagement with the at least one disk stack (26, 66) during a steady state condition; and
positioning a piston (40) for driving the at least one ball (38) into engagement with the apply plate (36) in response to application of a higher compressive force applied by a fluid under pressure.

11. The method of claim 10 further comprising:
operating in a normal mode of operation with the apply plate (36) compressing the return spring (34) in response to application of an intermediate compressive force applied by the fluid under pressure to transition into a state providing driving continuity between the driving and driven parts (22, 62).

12. The method of claim 10 further comprising:
operating in a locked mode of operation with the apply plate (36) compressing the return spring (34) and the apply spring (32) allowing the ball (38) to engage within a groove (39) of the apply plate (36) in response to application of the higher compressive force applied by the fluid under pressure to the apply plate (36) and to the piston (40), such that the apply plate (36) is locked in a state providing driving continuity between the driving and driven parts (22, 62), while allowing discontinuation of application of the higher compressive force applied by the fluid under pressure to the apply plate (36).

13. The method of claim 10 further comprising:
maintaining the ball (38) within a groove (39) of the apply plate (36) in response to a minimal compressive force applied by the fluid under a decreased pilot pressure to the piston (40).

14. The method of claim 13 further comprising:
disengaging the ball (38) from within the groove (39) of the apply plate (36) by interrupting the decreased pilot pressure to the piston (40) allowing a transition into a state out of driving continuity between the driving and driven parts (22, 62).

15. A power-transmitting device (10) using friction for securing and releasing driving continuity as between driving and driven parts (22, 62), and including an actuating device for transitioning the power-transmitting device (10) into or out of a state providing driving continuity between the driving and driven parts (22, 62), the actuating device powered by action of a fluid under pressure, where the actuating device includes an enclosure and an apply plate (36) slidably received in sealing engagement with the enclosure, fluid being admitted into the enclosure to apply a force to the enclosure and the apply plate (36), one of the enclosure and the apply plate (36) being connected to and rotating integrally with the driving or driven part (22, 62), relative displacement of the enclosure and apply plate (36) due to the force applied by the fluid contributing to transition of the power-transmitting device (10) into or out of the state providing driving continuity between the driving and driven parts (22, 62), the improvement comprising:
a return spring (34) acting on the apply plate (36), wherein the apply plate (36) directly contacts the return spring (34);
an apply spring (32) having a higher compression force than the return spring (34) located between the enclosure and the apply plate (36);
a lost motion retainer (56) enclosing the apply spring (32) and the return spring (34);

the apply plate (36) movable along an axis for compressing the apply spring (32) within the lost motion retainer (56), the apply plate (36) having a groove (39) formed therein;

a ball (38) engageable within the groove (39) of the apply plate (36) when the apply spring (32) is compressed;

a piston (40) for driving the ball (38) into engagement with the groove (39) of the apply plate (36) in response to application of a higher compressive force applied by a fluid under pressure;

a normal mode of operation, wherein the apply plate (36) compresses the return spring (34) in response to application of an intermediate compressive force applied by the fluid under pressure to transition into a state providing driving continuity between the driving and driven parts (22,62); and a locked mode of operation, wherein the apply plate (36) compresses the return spring (34) and the apply spring (32) allowing the ball (38) to engage within the groove (39) of the apply plate (36) in response to application of the higher compressive force applied by the fluid under pressure to the apply plate (36) and to the piston (40), such that the apply plate (36) is locked in a state providing driving continuity between the driving and driven parts (22, 62), while allowing discontinuation of application of the higher compressive force applied by the fluid under pressure to the apply plate (36), wherein application of a minimal compressive force by the fluid under a decreased pilot pressure to the piston (40) maintains the ball (38) within the groove (39) of the apply plate (36), and wherein interruption of the decreased pilot pressure to the piston (40) disengages the ball (38) from within the groove (39) of the apply plate (36) allowing a transition into a state out of driving continuity between the driving and driven parts (22, 62).

16. The improvement of claim 7, wherein the apply plate (36) and the lost motion retainer (56) are axially movable for compressing the apply spring (32).

* * * * *